(12) United States Patent
Noh et al.

(10) Patent No.: US 7,223,500 B2
(45) Date of Patent: May 29, 2007

(54) NON-AQUEOUS ELECTROLYTE AND A LITHIUM SECONDARY BATTERY COMPRISING THE SAME

(75) Inventors: Hyeong-Gon Noh, Suwon (KR); Cheol-Soo Jung, Ohsan (KR); Eui-Hwan Song, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 304 days.

(21) Appl. No.: 10/653,192

(22) Filed: Sep. 3, 2003

(65) Prior Publication Data

US 2004/0197667 A1   Oct. 7, 2004

(30) Foreign Application Priority Data

Mar. 24, 2003   (KR) .................... 10-2003-0018226

(51) Int. Cl.
   *H01M 6/18* (2006.01)
(52) U.S. Cl. .................. 429/307; 429/326; 429/330; 429/332; 429/331; 429/338; 429/340; 429/199; 429/200; 429/341
(58) Field of Classification Search ............. 429/326, 429/330, 331, 338, 340, 199, 200, 341, 307, 429/332
   See application file for complete search history.

(56) References Cited

U.S. PATENT DOCUMENTS 6,495,293 B1 *  12/2002  Arai et al. ................. 429/341
6,743,947 B1 *   6/2004  Xu et al. .................... 564/281
2004/0146786 A1 *  7/2004  Sato et al. .................. 429/330

FOREIGN PATENT DOCUMENTS

JP    10-189043    7/1998

OTHER PUBLICATIONS

C.R. Yang, Y.Y. Wang, C.C. Wan; Composition analysis of the passive film on the carbon electrode of a lithium-ion battery with an EC-based electrolyte;Journal of Power Sources 72 (1998) pp. 66-70.

Sid Megahed and Bruno Scrosati; Lithium-ion rechargeable batteries; Journal of Power Sources, 51 (1994; pp. 79-104.

Norio Takami et al.; Laminated Thin Li-Ion Batteries Using a Liquid Electrolyte; Journal of the Electrochemical Society, 149 (1) A9-12 (2002); pp. A9-A12.

* cited by examiner

*Primary Examiner*—Laura Weiner
(74) *Attorney, Agent, or Firm*—Stein, McEwen & Bui, LLP (57) ABSTRACT

An electrolyte of a lithium secondary battery includes lithium salts, an organic solvent with a high boiling point, and a carbonate-based additive compound having substituents selected from the group consisting of a halogen, a cyano (CN), and a nitro ($NO_2$). The electrolyte improves discharge, low temperature, and cycle life characteristics of a lithium secondary battery.

58 Claims, 5 Drawing Sheets

NON-AQUEOUS ELECTROLYTE AND A LITHIUM SECONDARY BATTERY COMPRISING THE SAME

CROSS-REFERENCE TO RELATED APPLICATIONS

This application claims the benefit of Korean Application No. 2003-18226, filed Mar. 24, 2003, in the Korean Intellectual Property Office, the disclosure of which is incorporated herein by reference.

BACKGROUND OF THE INVENTION

1. Field of the Invention

The present invention relates to an electrolyte of a lithium secondary battery and a lithium secondary battery comprising the same, and more particularly, to an electrolyte of a lithium secondary battery that prevents the battery from swelling while maintaining the electrochemical properties of the battery, and a lithium secondary battery comprising the same.

2. Description of the Related Art

Due to recent trends toward more compact and lighter portable electronic equipment, there has been a growing need to develop a high performance and large capacity battery to power the portable electronic equipment. In particular, there has been extensive research to provide lithium secondary batteries with good safety characteristics and improved electrochemical properties. Lithium secondary batteries use lithium metal oxides as positive active materials, and lithium metals, lithium-containing alloys, or crystalline or amorphous carbons, or carbon-containing composites as negative active materials.

The average discharge voltage of a lithium secondary battery is about 3.6 to 3.7 V, which is higher than the average discharge voltage of other alkali batteries, Ni-MH batteries, Ni—Cd batteries, and the like. An electrolyte that is electrochemically stable in the charge and discharge voltage range of 0 to 4.2 V is required to generate a high driving voltage. As a result, a mixture of non-aqueous carbonate-based solvents, such as ethylene carbonate, dimethyl carbonate, diethyl carbonate, and the like, is used as an electrolyte. However, such an electrolyte has significantly lower ion conductivity than an aqueous electrolyte that is used in a Ni-MH battery or a Ni—Cd battery, thus resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode, where the ions are intercalated into the carbon. Because of lithium's high reactivity, lithium reacts with the carbon negative electrode to produce $Li_2CO_3$, $LiO$, $LiOH$, and the like, thus forming a thin film on the surface of the negative electrode. The film is referred to as an organic solid electrolyte interface (SEI) film. The organic SEI film formed during the initial charge not only prevents the reaction between the lithium ions and the carbon negative electrode or other materials during charging and discharging, but also acts as an ion tunnel, allowing the passage of only lithium ions. The ion tunnel prevents disintegration of the structure of the carbon negative electrode, which is caused by co-intercalation of organic solvents having a high molecular weight, along with solvated lithium ions, into the carbon negative electrode.

Once the organic SEI film is formed, lithium ions do not react again with the carbon electrode or other materials, so that an amount of lithium ions is maintained. That is, the carbon of the negative electrode reacts with an electrolyte during the initial charging, thus forming a passivation layer such as an organic SEI film on the surface of the negative electrode so that the electrolyte solution no longer decomposes, and stable charging and discharging are maintained (J. Power Sources, 51(1994), 79–104). Due to the above reasons, in the lithium secondary battery, there is no irreversible formation reaction of the passivation layer, and a stable cycle life after the initial charging reaction is maintained.

However, gases are generated inside the battery due to decomposition of a carbonate-based organic solvent during the organic SEI film-forming reaction (J. Power Sources, 72 (1998), 66–70). The gases include $H_2$, $CO$, $CO_2$, $CH_4$, $C_2H_6$, $C_3H_8$, $C_3H_6$, and the like, depending on the type of non-aqueous organic solvent and the negative active material used. The thickness of the battery increases during charging due to the generation of gas inside the battery.

The passivation layer is slowly disintegrated by electrochemical energy and heat energy, which increases with the passage of time when the battery is stored at a high temperature after being charged. Accordingly, a side reaction in which an exposed surface of the negative electrode reacts with surrounding electrolyte occurs continuously. The internal pressure of the battery increases with the generation of gases, inducing the deformation of prismatic batteries or pouch batteries. As a result, regional differences in the cohesion among electrodes inside the electrode assembly (positive and negative electrodes, and separator) of the battery occur, thus deteriorating the performance and safety of the battery, and making it difficult to mount the lithium secondary battery set into electronic equipment.

To improve low temperature characteristics, a lithium secondary battery using liquid electrolyte uses an organic solvent with a low boiling point which induces swelling of a prismatic or pouch battery during high temperature storage. As a result, reliability and safety of the battery are deteriorated at a high temperature.

Accordingly, extensive research into a liquid electrolyte with a high boiling point is needed. An example of an electrolyte with a high boiling point includes an ester solvent, such as gamma butyrolactone (GBL). When using 30 to 70% of an ester solvent, cycle life characteristics are significantly deteriorated, and therefore it is difficult to apply an electrolyte with an ester solvent to batteries. It has been suggested that, as an electrolyte with a high boiling point, a mixture of gamma butyrolactone/ethylene carbonate (7/3) may be used, and a boron-coated mesocarbon fiber (MCF) as a negative active material may be used to reduce swelling at a high temperature and improve cycle life characteristics (Journal of Electrochemical Society, 149(1) A(9)–A12 (2002)). However, when an uncoated carbonaceous material is used as a negative active material, cycle life characteristics are deteriorated even when an electrolyte with a high boiling point is used. It should be noted that ethylene carbonate need not be used in all aspects, i.e., GBL may be used alone as the solvent.

To solve the problem of deterioration of cycle life characteristics, an electrolyte including vinylene carbonate has been developed (U.S. Pat. Nos. 5,352,458 and 5,626,981). However, sufficient improvement of cycle life characteristics has not been obtained.

U.S. Pat. No. 5,529,859 discloses an electrolyte that is prepared by adding a halogenated organic solvent, e.g., chloroethylene carbonate, to propylene carbonate, resulting in improvement of battery performance and capacity. U.S. Pat. No. 5,571,635 discloses an electrolyte that is prepared by adding a halogenated organic solvent, e.g., chloroethylene carbonate to a mixture of propylene carbonate and ethylene carbonate, resulting in improvement of battery performance and capacity. The propylene carbonate has a high viscosity. When propylene carbonate is applied to a battery along with a crystalline carbon such as graphite, the propylene carbonate is inserted into a carbon layer of the negative electrode and is decomposed to generate propylene gases and lithium carbonate, resulting in a reduction of battery capacity and an increase of irreversible capacity. In the above U.S. Patents, propylene carbonate and chloroethylene carbonate are used in a mixed ratio of 1:1, but with the above mixed ratio, the wetability of the electrolyte is low.

SUMMARY OF THE INVENTION

To solve the problems stated above and/or other problems, it is an aspect of the present invention to provide a non-aqueous electrolyte of a lithium secondary battery comprising additive compounds that inhibit the generation of gas inside the battery, and thus inhibit a consequent variation of battery thickness.

It is another aspect of the present invention to provide a lithium secondary battery having effective discharge and low temperature characteristics, and not exhibiting swelling from gas generation.

To accomplish the above and/or other aspects, the present invention provides an electrolyte of a lithium secondary battery comprising lithium salts; an organic solvent with a high boiling point; and a carbonate-based additive compound having substituents selected from the group consisting of a halogen, a cyano (CN), and a nitro ($NO_2$).

Additional aspects and advantages of the invention will be set forth in part in the description which follows and, in part, will be obvious from the description, or may be learned by practice of the invention.

The present invention further provides a lithium battery including the electrolyte.

Other features and/or advantages of the present invention will be apparent from the following description taken in conjunction with the accompanying drawings, in which like reference characters designate the same or similar parts throughout the figures thereof.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

In the following detailed description, embodiments of the invention are shown and described, simply by way of illustration of the best mode contemplated by the inventors of carrying out the invention. As will be realized, the invention may be modified in various respects, all without departing from the invention. Accordingly, the drawings and description are to be regarded as illustrative in nature, and not restrictive.

Figure 1:
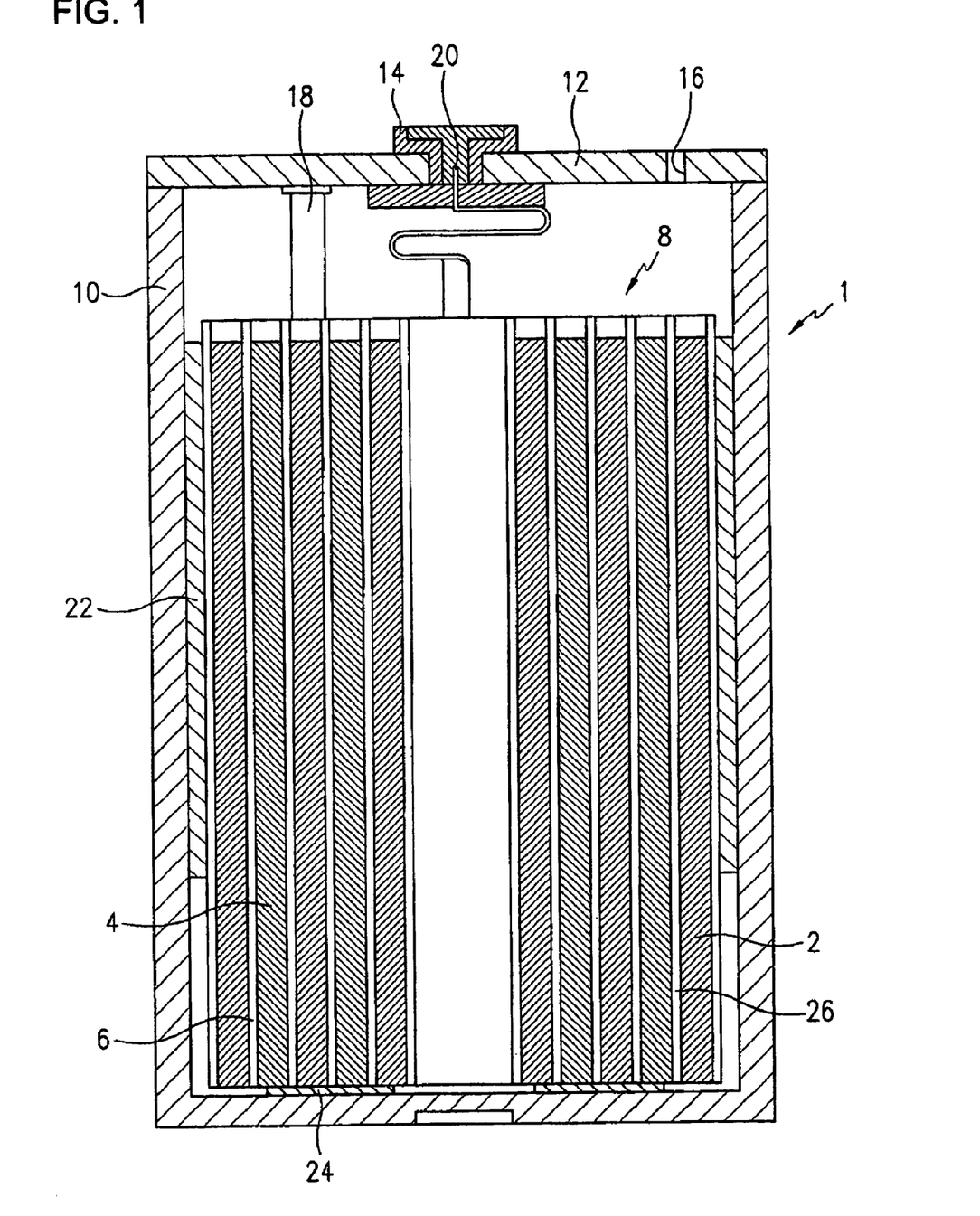
FIG. 1 is a cross-sectional view of a prismatic lithium secondary battery cell.

A cross-sectional view of a non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes, into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and negative electrode 4. Insulators 22 and 24 are installed on the lower part and the side part of the electrode assembly 8 to prevent a short circuit occurrence in the battery.

The electrolyte of the present invention, including a solvent with a high boiling point and a carbonate-based additive compound, improves swelling inhibition, cycle life, and low temperature characteristics of the battery even though a conventional material that reversibly intercalates/deintercalates the lithium ions or a material that reversibly forms a lithium-containing compound are used as a positive active material, and conventional carbonaceous materials are used as a negative material.

The organic solvent with a high boiling point improves swelling inhibition properties at a high temperature. But if the organic solvent with a high boiling point is used in an amount of more than 30 volume % based on the total amount of electrolyte, the capacity and the cycle life characteristics of the battery are significantly deteriorated.

Currently-used positive active materials include a lithium-cobalt-based oxide, a lithium-manganese-based oxide, a lithium-nickel-based oxide, a lithium-nickel-manganese-based oxide, and the like. The lithium-nickel-based or lithium-nickel-manganese-based oxide is inexpensive and represents a high discharge capacity, but has a limitation due to gas generation during high-temperature storage. However, the electrolyte of the present invention may solve the problem of deterioration of battery performance even when the lithium-nickel-based or lithium-nickel-manganese-based oxide is used as a positive active material, and a conventional carbonaceous material is used as a negative material.

Graphite that is generally used as a negative active material of a lithium secondary battery may maintain a uniform potential during lithium intercalation into the graphite layer, and thus, has an effective voltage flatness, but has shortcomings in that the theoretical discharge capacity is less than 372 mAh/g and the actual capacity is less than 300 mAh/g. Natural graphite has a large discharge capacity, but a large irreversible capacity, compared with artificial graphite such as mesocarbon microbeads (MCMB) or mesocarbon fiber (MCF). The natural graphite has a sheet shape, and thus, discharge characteristics of the electrode are deteriorated. However, the electrolyte of the present invention solves the above problem of the graphite, especially natural graphite.

The electrolyte of a lithium secondary battery includes lithium salts; an organic solvent with a high boiling point; and a carbonate-based additive compound having substituents selected from the group consisting of a halogen, a cyano (CN), and a nitro ($NO_2$).

The carbonate-based additive compound that is added to the lithium salt-containing organic solvent with a high boiling point may inhibit swelling caused by gas generation inside the battery, and may solve problems of deterioration of the capacity and cycle life characteristics due to the use of an organic solvent with a high boiling point. The inventive electrolyte may improve swelling inhibition at a high temperature, and capacity and low temperature characteristics of the battery even though conventional materials are used as active materials.

The carbonate-based additive compound includes electron-withdrawing groups with high electronegativity selected from the group consisting of a halogen, a cyano (CN), and a nitro ($NO_2$). The carbonate-based additive compound is preferably a cyclic carbonate. As the cyclic carbonate, an ethylene carbonate derivative represented by formula (1) is preferable:

(1)

wherein X is selected from the group consisting of a halogen, a cyano (CN), and a nitro ($NO_2$).

The carbonate-based additive compound is added in an amount of 0.01 to 10 wt %, and preferably 0.01 to 5 wt %, based on the total amount of the electrolyte. The inhibition effect of gas generation inside the battery is not sufficient when the compound is used in an amount of less than 0.1 wt %. The cycle life characteristics of the battery at a high temperature are decreased, and swelling at high temperature occurs when the compound is used in an amount exceeding 10 wt %.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.6 to 2.0 M, more preferably from 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity.

The lithium salt acts as a supply source of lithium ions in the battery, making the basic operation of a lithium battery possible. The non-aqueous organic solvent plays a role of a medium wherein ions capable of participating in the electrochemical reaction are mobilized.

The organic solvent with a high boiling point has a boiling point of greater than or equal to 100° C., preferably more than or equal to 150° C., and more preferably greater than or equal to 200° C. The organic solvents include γ-butyrolactone, ethylene carbonate, dipropyl carbonate, acid anhydride, N-methyl pyrrolidone, N-methylacetamide, N-methyl formamice, acetonitrile, dimethyl formamide, sulforane, dimethyl sulfoxide, dimethyl sulfite, and the like.

The electrolyte of the present invention further comprises an organic solvent with a low boiling point or an aromatic hydrocarbon organic solvent of formula (2):

(2)

wherein R is a halogen or a $C_1$ to $C_{10}$ alkyl, and n is an integer of 0 to 6, preferably 1 to 5.

When the organic solvent with a high boiling point and the organic solvent with a low boiling point or the aromatic hydrocarbon organic solvent are used together, the organic solvent with a high boiling point is preferably used in an amount of 30 to 95 volume % of the total organic solvent.

Examples of the organic solvent with the low boiling point include dimethyl carbonate (DMC), diethyl carbonate (DEC), methylpropyl carbonate (MPC), ethylpropyl carbonate (EPC), methylethyl carbonate (MEC), propylene carbonate (PC), and butylene carbonate (BC). Examples of the aromatic hydrocarbon organic solvent include benzene, fluorobenzene, toluene, fluorotoluene, trifluorotoluene, xylene, are not limited thereto.

The electrolyte of the present invention further comprises a swelling-inhibiting additive, and thus improves swelling inhibition properties. The swelling-inhibiting additive preferably includes an organic sulfone-based compound or an anisole-based compound. The sulfone-based compound is represented by the formula (3):

(3)

wherein $R_1$ and $R_2$ are independently selected from the group consisting of a primary, secondary, or tertiary alkyl group, an alkenyl group, an aryl group, and a cycloalkyl group, and preferably a $C_1$ to $C_4$ alkyl, a $C_2$ to $C_4$ alkenyl, a $C_6$ to $C_{14}$ aryl, and a $C_3$ to $C_6$ cycloalkyl, or $R_1$ and $R_2$ are bound together to form a cyclic ring. More preferably, one of $R_1$ and $R_2$ is a halogen-substituted alkyl group, an alkenyl group, an aryl group, or a cycloalkyl group and the other one of $R_1$ or $R_2$ is an alkenyl such as vinyl.

Specific examples of a sulfone-based compound preferably include vinyl sulfone, methyl sulfone, methylvinyl sulfone, ethylvinyl sulfone, phenyl sulfone, phenylvinyl sulfone, chlorophenylvinyl sulfone, fluorophenylvinyl sulfone, benzyl sulfone, tetramethylene sulfone, and butadiene sulfone, but are not limited thereto.

The sulfone-based compound may inhibit swelling resulting from gas generation on the negative electrode during initial charging, and improve cycle life and capacity characteristics. The sulfone-based compound is used in an amount of 0.01 to 10 wt %, preferably 0.01 to 6 wt % of the total amount of the electrolyte. The addition effect of the compound is not realized sufficiently when the sulfone-based compound is used in an amount of less than 0.01 wt %, and the capacity and cycle life characteristics of the battery are decreased when the sulfone-based compound is used in an amount exceeding 10 wt %.

The anisole-based compound is represented by the formula (4):

(4)

wherein $R_4$ is a $C_1$ to $C_{10}$ alkyl, a $C_1$ to $C_{10}$ alkoxy, or a $C_6$ to $C_{10}$ aryl, and preferably a methyl, ethyl, or methoxy; X is a halogen; and m and n are integers ranging from 1 to 5, where m+n is less than or equal to 6.

The compound of formula (4) inhibits gas generation at a high temperature, and thus, decreases swelling of a battery. Exemplary compounds represented by formula (4) preferably include 3-fluoroanisole, 3-chloroanisole, 3-bromoanisole, 4-fluoroanisole, 4-chloroanisole, 4-bromoanisole, 2,4-difluoroanisole, 3,5-difluoroanisole, 3-chloro-5-fluoroanisole, and the like. The anisole-based compound may inhibit swelling resulting from gas generation on the negative electrode at initial charging, and improve cycle life and capacity characteristics. The compound of formula (4) is used in an amount of 0.01 to 10 wt %, preferably 0.01 to 6 wt % of the total amount of the electrolyte. The addition effect of the compound is not realized sufficiently when the compound is used in an amount of less than 0.01 wt %, and the capacity characteristics of the battery are decreased when the compound is used in an amount exceeding 10 wt %.

In addition to the above compounds, exemplary swelling-inhibiting additives include propane sultone, bisphenol, dimethylfuran, 1,3-propandiol cyclic sulfate, N-acetylcaprolactam, and the like, but are not limited thereto. The compounds are used in an amount of 0.01 to 10 wt %, preferably 0.01 to 6 wt % of the total amount of the electrolyte. The addition effect of the above compounds is not realized sufficiently when the compounds are used in an amount of less than 0.01 wt %, and the capacity characteristics of the battery are decreased when the compound is used in an amount exceeding 10 wt %.

The electrolyte for a lithium secondary battery of the present invention is stable at a temperature ranging from −20 to 60° C., thus maintaining stable characteristics of the battery even at a voltage of 4 V. The electrolyte of the present invention may be applied to all lithium secondary batteries, such as a lithium ion battery, a lithium polymer battery, and the like.

The present invention provides a lithium secondary battery comprising the electrolyte. The lithium secondary battery of the present invention uses a material that reversibly intercalates/deintercalates the lithium ions (lithiated intercalation compound), and a material that reversibly forms a lithium-containing compound or sulfur-based compound, as a positive active material. Examples of the material that reversibly intercalates/deintercalates the lithium ions are a lithium-containing metal oxide or a lithium-containing calcogenide compound such as $LiCoO_2$, $LiNiO_2$, $LiMnO_2$, $LiMn_2O_4$, $LiNi_{1-x-y}Co_xM_yO_2$ (0<x<1, 0<y<1, 0<x+y<1, M is a metal such as Al, Sr, Mg, La, etc.), $LiFeO_2$, $V_2O_5$, $TiS_2$, and $MoS_2$. The compounds that reversibly form a lithium-containing compound by a reaction with lithium ions include silicon (Si), titanium nitrate, and tin oxide ($SnO_2$). The sulfur-based compounds which form the positive active material of the lithium-sulfur battery, include a sulfur element, $Li_2S_n$ (n 1), an organic sulfur compound, $Li_2S_n$ (n 1) dissolved in a catholyte, and a carbon-sulfur polymer $((C_2S_x)_n$ where x=2.5 to 50 and n 2).

The lithium secondary battery of the present invention uses a lithium metal, a lithium-containing alloy, or a material that reversibly intercalates/deintercalates the lithium ions, as a negative active material. Examples of a material that reversibly intercalates/deintercalates the lithium ions are crystalline or amorphous carbon, or a carbon complex. Examples of crystalline carbon include natural graphite or artificial graphite, such as mesocarbon fiber (MCF) or mesocarbon microbeads (MCMB). Examples of non-crystalline carbon include soft carbon (low-temperature calcinated carbon), which is obtained by heat-treating pitch at 1000° C., and hard carbon (high-temperature calcinated carbon), which is obtained by carbonizing polymer resin. As described above, the lithium secondary battery of the present invention has effective electrochemical properties even though graphite is used as a negative active material. Therefore, unmodified graphite, especially natural graphite, is used as a negative active material of the battery of the present invention. The natural graphite is used with other carbonaceous materials, and the content of natural graphite is preferably 1 to 100 wt % of the negative active material.

A lithium secondary battery is fabricated by the following process. Positive and negative electrodes are fabricated by coating a slurry including active materials on a current collector of an appropriate thickness and length. An electrode assembly is prepared by winding or laminating a positive electrode, a negative electrode, and a separator interposed between the positive and negative electrodes, then placing the electrode assembly into a battery case. An electrolyte of the present invention is injected into the case, and the upper part of the battery case is sealed. The separator interposed between the positive and negative electrodes is a polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator.

After charge-discharge of the lithium secondary battery, electrolytes obtained by disintegrating the battery are measured using gas chromatography-mass analysis (GC-MS) at 40° C. under the increment of 15° C./min, and show a peak of the carbonate-based compound at about 14 minutes.

The lithium secondary battery of the present invention may be utilized to provide power in an electronic device. For example, the lithium secondary battery may be implemented in one of a cellular telephone, a portable telephone, a video game, a portable television, a portable computer, a notebook computer, a calculator, a computer, a telephone, an electronic toy, a digital clock, and the like.

Hereinafter, the present invention is explained in detail with reference to examples. The examples, however, should not in any sense be interpreted as limiting the scope of the present invention.

EXAMPLES AND COMPARATIVE EXAMPLES

Example 1

γ-butyrolactone (GBL)/ethylene carbonate (EC)/ethyl methyl carbonate (EMC)/dimethyl carbonate (DMC)/fluorobenzene (FB) were mixed in a volume ratio of 10/3/5/1/1 to prepare an organic mixed solvent. 1.15 M $LiPF_6$ were added to the solvent, and a carbonate-based additive including 2 wt % of fluoroethylene carbonate based on the total amount of the electrolyte was further added to the solution to prepare a composition to form an electrolyte.

$LiCoO_2$ having an average particle diameter of 10 μm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus manufacturing a positive electrode having a width of 4.9 cm and a thickness of 147 μm. Artificial graphite (PHS) as a negative active material, oxalic acid, and PVdF as a binder were mixed in a weight ratio of 89.8:0.2:10 to prepare a negative material slurry. The slurry was coated on a copper foil, dried, and compressed by a roll press, thus manufacturing a negative electrode having a width of 5.1 cm and a thickness of 178 μm. Between the manufactured positive and negative electrodes, a polyethylene porous film separator having a width of 5.35 cm and a thickness of 18 μm was interposed followed by winding and placing into a prismatic can. 2.3 g of the electrolyte prepared as above were injected into the can, thus completing the fabrication of the 660 mAh pouch-type lithium secondary battery cell.

Example 2

A lithium secondary battery cell was prepared in the same manner as in Example 1, except that 1.15 M $LiPF_6$ and an additive including 2 wt % of fluoroethylene carbonate and 0.25 wt % of vinyl sulfone based on the total weight of electrolyte were added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/1/1 to prepare a composition to form an electrolyte.

Example 3

A lithium secondary battery cell was prepared in the same manner as in Example 1, except that 1.15 M $LiPF_6$ and an additive including 1 wt % of fluoroethylene carbonate and 0.25 wt % of vinyl sulfone based on the total weight of electrolyte were added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Example 4

A lithium secondary battery cell was prepared in the same manner as in Example 1, except that 1.15 M $LiPF_6$ and an additive including 1 wt % of fluoroethylene carbonate and 2 wt % of 3-chloroanisole based on the total weight of electrolyte were added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Example 5

A lithium secondary battery cell was prepared in the same manner as in Example 1, except that 1.15 M $LiPF_6$ and an additive including 1 wt % of fluoroethylene carbonate, 0.25 wt % of vinyl sulfone, and 2 wt % of 3-chloroanisole based on the total weight of electrolyte were added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Example 6

A lithium secondary battery cell was prepared in the same manner as in Example 1, except that 1.15 M $LiPF_6$ and an carbonate-based additive including 5 wt % of fluoroethylene carbonate based on the total weight of electrolyte were added to a mixed solvent of ethylene carbonate (EC)/ethyl methyl carbonate (EMC)/dimethyl carbonate (DMC)/fluorobenzene (FB) in a volume ratio of 30/50/10/10 to prepare a composition to form an electrolyte.

Example 7

A lithium secondary battery cell was prepared in the same manner as in Example 1, except that 1.15 M $LiPF_6$ and an additive including 5 wt % of fluoroethylene carbonate and 0.75 wt % of vinyl sulfone based on the total weight of electrolyte were added to a mixed solvent of ethylene carbonate (EC)/ethyl methyl carbonate (EMC)/dimethyl carbonate (DMC)/fluorobenzene (FB) in a volume ratio of 30/50/10/10 to prepare a composition to form an electrolyte.

Comparative Example 1

A lithium secondary battery cell was prepared in the same manner as in Example 1, except that 1.15 M $LiPF_6$ was added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Comparative Example 2

A lithium secondary battery cell was prepared in the same manner as in Example 1, except that 1.15 M $LiPF_6$ and an additive including 2 wt % of vinylene carbonate based on the total weight of electrolyte were added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Comparative Example 3

A lithium secondary battery cell was prepared in the same manner as in Example 1, except that 1.15 M $LiPF_6$ was added to a mixed solvent of ethylene carbonate (EC)/ethyl methyl carbonate (EMC)/dimethyl carbonate (DMC)/fluorobenzene (FB) in a volume ratio of 30/50/10/10 to prepare a composition to form an electrolyte.

Comparative Example 4

A lithium secondary battery cell was prepared in the same manner as in Example 1, except that 1.15 M $LiPF_6$ and an additive including 5 wt % of vinylene carbonate based on the total weight of electrolyte were added to a mixed solvent of ethylene carbonate (EC)/ethyl methyl carbonate (EMC)/dimethyl carbonate (DMC)/fluorobenzene (FB) to prepare a composition to form an electrolyte.

Comparative Example 5

A lithium secondary battery cell was prepared in the same manner as in Example 1, except that 1.15 M $LiPF_6$ and an additive including 0.25 wt % of vinyl sulfone based on the total weight of electrolyte were added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Figure 2:
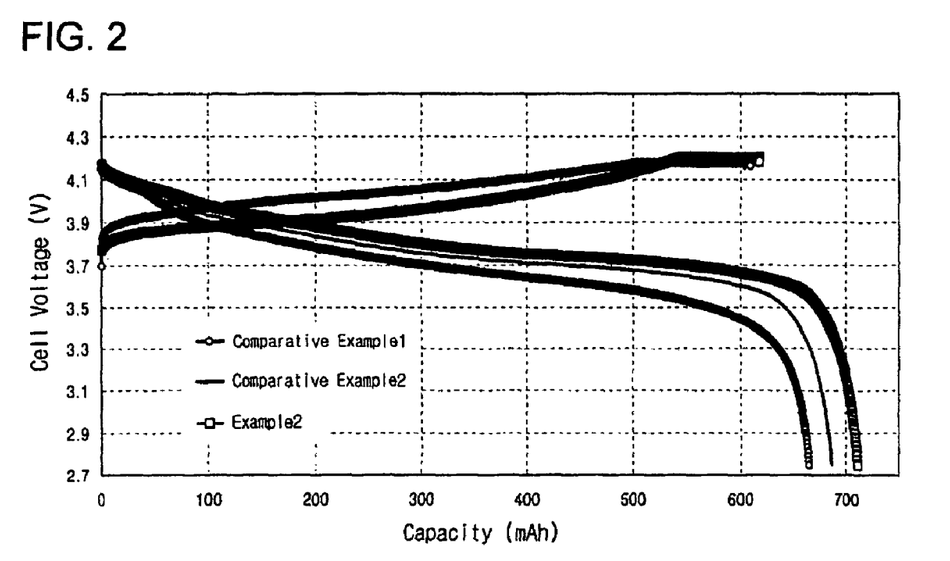
FIG. 2 is a graph illustrating discharge characteristics of the battery cells according to Example 1 of the present invention, and Comparative Examples 1 and 2.

In order to evaluate discharge characteristics, the lithium battery cells according to Example 1 and Comparative Examples 1 and 2 were charged at 0.5 C, to a cut-off current of 20 mA and a cut-off voltage of 4.2 V under constant current and constant voltage (CC-CV) at 25° C., then discharged at 0.2 C to a cut-off voltage of 2.75 V. The measurement results shown in FIG. 2 indicate that the discharge capacity of Example 1 was relatively improved over the discharge capacities of Comparative Examples 1 and 2.

Figure 3:
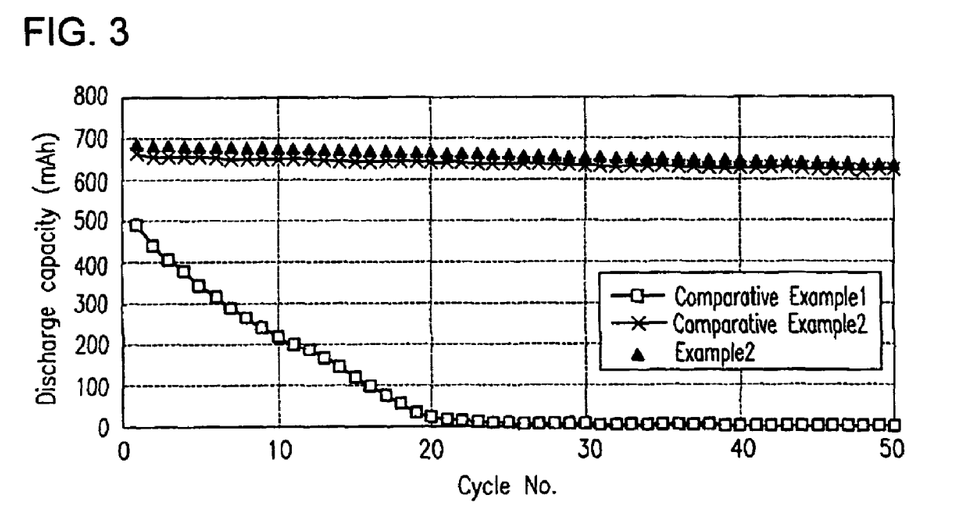
FIG. 3 is a graph illustrating cycle life characteristics of the battery cells according to Example 2 of the present invention, and Comparative Examples 1 and 2.

The lithium battery cells according to Example 2 and Comparative Examples 1 and 2 were charged at 1 C, to a cut-off current of 20 mA and a cut-off voltage of 4.2 V under constant current and constant voltage (CC-CV), and then discharged at 1 C to a cut-off voltage of 2.75 V. The charge-discharge was repeated for 50 cycles to evaluate cycle life characteristics. The results are shown in FIG. 3. As shown in FIG. 3, the cycle life of Comparative Example 1 without a carbonate-based compound decreased abruptly, but the cycle lives of Comparative Example 2 and Example 2 including a carbonate-based compound were improved.

To evaluate swelling inhibition properties of Examples and Comparative Examples, battery cells of Examples 1, 2, 3, 6, 7, and Comparative Examples 3 and 4 were charged to 4.2 V and placed in a chamber at a high temperature of 90° C. for 4 hours, followed by measurement of variation of battery thickness. The measurement results are shown in Table 1. The increase rates of the thickness of the cells of Table 1 are values relative to the thickness measured before high temperature storage and are the average value of 10 test cells.

TABLE 1

|  | Additives | Initial Thickness (mm) | Thickness after high temperature storage (mm) | Thickness variation ratio |
| --- | --- | --- | --- | --- |
| Example 1 | FEC (2 wt %) | 4.15 | 4.82 | 116% |
| Example 2 | FEC (2 wt %) VS (0.25 wt % | 4.15 | 4.45 | 107% |
| Example 3 | FEC (1 wt %) VS (0.25 wt % | 4.15 | 4.29 | 103% |
| Example 6 | FEC (5 wt %) | 4.15 | 12.81 | 309% |
| Example 7 | FEC (5 wt %) VS (0.75 wt % | 4.15 | 5.22 | 126% |
| Comparative Example 3 | No additive | 4.15 | 5.25 | 127% |
| Comparative Example 4 | VC (5 wt %) | 4.15 | 13.45 | 324% |

Note:
FEC: fluoroethylene carbonate
VS: vinyl sulfone
VC: vinylene carbonate

As shown in Table 1, swelling inhibition properties at high temperature of Examples 2, 3, and 7 according to the present invention were improved over Comparative Examples including other additives. In particular, Example 2 including both fluoroethylene and vinyl sulfone showed a more effective swelling inhibition property than Example 1 including only fluoroethylene.

Figure 4:
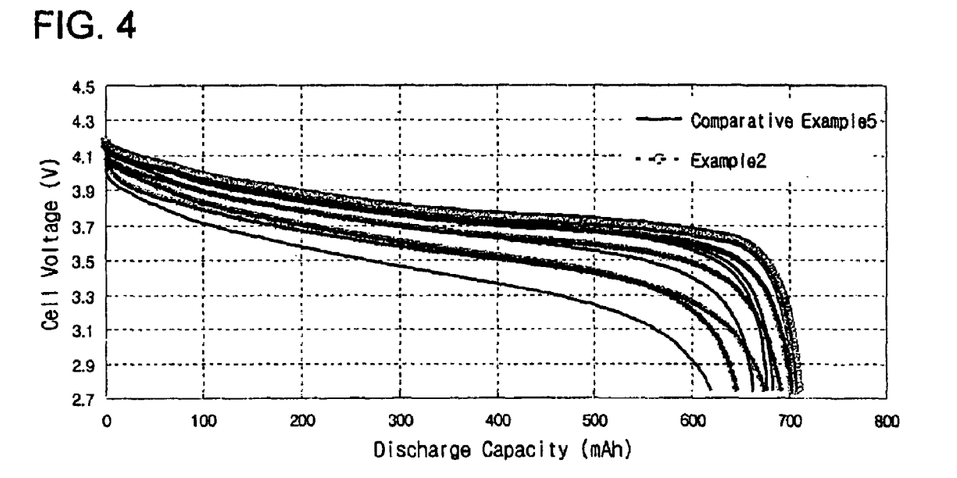
FIG. 4 is a graph illustrating the discharge characteristics of the battery cells according to Example 2 of the present invention, and Comparative Example 5, at various C-rates.

The lithium battery cells according to Example 2 and Comparative Example 5 were charged at 0.5 C, to a cut-off current of 20 mA and a cut-off voltage of 4.2 V under constant current and constant voltage (CC-CV), and then discharged at 0.2 C, 0.5 C, 1 C, and 2 C to a cut-off voltage of 2.75 V. The results are shown in FIG. 4. As illustrated in FIG. 4, a discharge capacity of Example 2 including both fluoroethylene and vinyl sulfone is greater than Comparative Example 51 which includes only vinyl sulfone.

Example 8

γ-butyrolactone (GBL)/ethylene carbonate (EC)/ethyl methyl carbonate (EMC)/dimethyl carbonate (DMC)/fluorobenzene (FB) were mixed in a volume ratio of 10/3/5/1/1 in order to prepare an organic mixed solvent. 1.15 M $LiPF_6$ were added to the solvent, and an carbonate-based additive including 5 wt % of fluoroethylene carbonate based on the total weight of the electrolyte was further added to the solution to prepare a composition to form an electrolyte.

$LiCoO_2$ having an average particle diameter of 10 μm as a positive active material, Super P (acetylene black) as a conductive agent, and styrene-butadiene rubber (SBR) as a binder were mixed in a weight ratio of 94:3:3 in water to prepare a positive slurry. The slurry was coated on an aluminum foil, dried, and compressed by a roll press, thus manufacturing a positive electrode having a width of 4.9 cm and a thickness of 147 μm. Quasi-artificial graphite (C1S) as a negative active material, oxalic acid, and SBR as a binder were mixed in a weight ratio of 89.8:0.2:10 to prepare a negative material slurry. The slurry was coated on a copper foil, dried, and compressed by a roll press, thus manufacturing a negative electrode having a width of 5.1 cm and a thickness of 178 μm. Between the manufactured positive and negative electrodes, a polyethylene porous film separator having a width of 5.35 cm and a thickness of 18 μm was interposed followed by winding and placing into a prismatic can. 2.3 g of the electrolyte prepared as above were injected into the can, thus completing the fabrication of the 750 mAh pouch-type lithium secondary battery cell.

Example 9

A lithium secondary battery cell was prepared in the same manner as in Example 8, except that 1.15 M LiPF$_6$ and an additive including 5 wt % of fluoroethylene carbonate based on the total weight of electrolyte were added to a mixed solvent of ethylene carbonate (EC)/ethyl methyl carbonate (EMC)/dimethyl carbonate (DMC)/fluorobenzene (FB) in a volume ratio of 30/50/10/10 to prepare a composition to form an electrolyte.

Comparative Example 6

A lithium secondary battery cell was prepared in the same manner as in Example 8, except that 1.15 M LiPF$_6$ was added to a mixed solvent of γ-butyrolactone (GBL)/ethylene carbonate (EC)/ethyl methyl carbonate (EMC)/dimethyl carbonate (DMC)/fluorobenzene (FB) in a volume ratio of 10/3/5/5/1/1 to prepare a composition to form an electrolyte.

Comparative Example 7

A lithium secondary battery cell was prepared in the same manner as in Example 8, except that 1.15 M LiPF$_6$ was added to a mixed solvent of ethylene carbonate (EC)/ethyl methyl carbonate (EMC)/dimethyl carbonate (DMC)/fluorobenzene (FB) in a volume ratio of 30/50/10/10 to prepare a composition to form an electrolyte.

Figure 5:
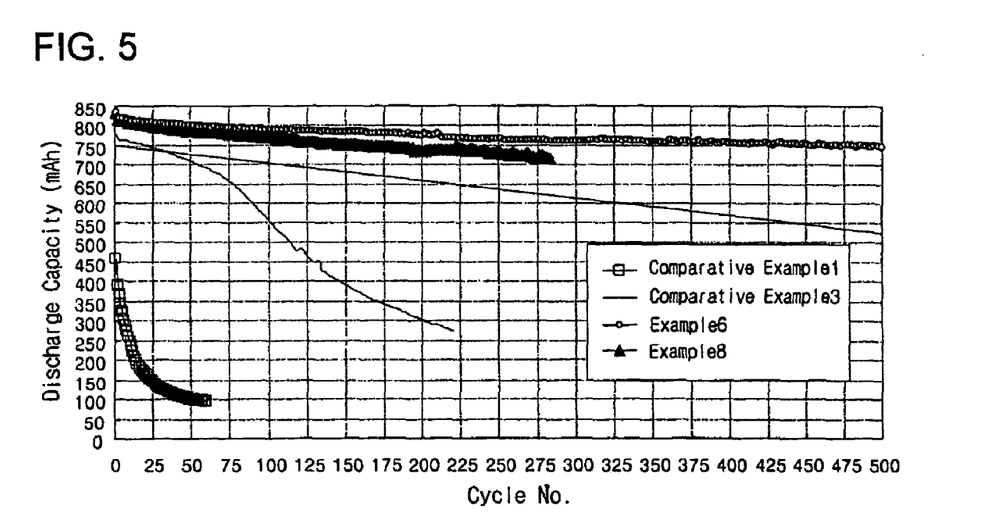
FIG. 5 is a graph illustrating cycle life characteristics of the battery cells according to Examples 6 and 8 of the present invention, and Comparative Examples 1 and 3.

The lithium battery cells according to Examples 6 and 8 and Comparative Examples 1 and 3 were charged at 1 C, to a cut-off current of 75 mA and a cut-off voltage of 4.2 V under constant current and constant voltage (CC-CV), and then discharged at 1 C to a cut-off voltage of 2.75 V. The charge-discharge was repeated to evaluate cycle life characteristics. The results are shown in FIG. 5. In FIG. 5, the diagonal solid line shows 70% cycle life maintenance. As illustrated in FIG. 5, cycle lives of Comparative Examples 6 and 7 without a carbonate-based additive were decreased significantly, but those of Examples 8 and 9 were maintained excellently at the 500$^{th}$ cycle.

Examples 10–13

Ethylene carbonate (EC)/ethyl methyl carbonate (EMC)/dimethyl carbonate (DMC)/fluorobenzene (FB) were mixed in a volume ratio of 30/50/10/10 in order to prepare an organic mixed solvent. 1.15 M LiPF$_6$ were added to the solvent, and a carbonate-based additive including 1, 2, 3, and 5 wt % of fluoroethylene carbonate based on the total weight of the electrolyte, were further added to the solution to prepare compositions to form electrolytes.

LiCoO$_2$ having an average particle diameter of 10 μm as a positive active material, Super P (acetylene black) as a conductive agent, and styrene-butadiene rubber (SBR) and carboxyl methyl cellulose (CMC) as a binder were mixed in a weight ratio of 94:3:3 in water to prepare a positive slurry. The slurry was coated on an aluminum foil, dried, and compressed by a roll press, thus manufacturing a positive electrode having a width of 4.9 cm and a thickness of 147 μm. A mixture of natural graphite (DAG10) and quasi-artificial graphite (C1S) as a negative active material, oxalic acid, and a mixture of SBR and CMC as a binder were mixed in a weight ratio of 89.8:0.2:10 to prepare a negative material slurry. The slurry was coated on a copper foil, dried, and compressed by a roll press, thus manufacturing a negative electrode having a width of 5.1 cm and a thickness of 178 μm. Between the manufactured positive and negative electrodes, a polyethylene porous film separator having a width of 5.35 cm and a thickness of 18 μm was interposed followed by winding and placing into prismatic cans. 2.3 g of the electrolytes prepared as above were injected into the cans, thus completing the fabrication of the 800 mAh pouch-type lithium secondary battery cells.

Comparative Examples 8–11

Lithium secondary battery cells were prepared in the same manner as in Examples 10 to 13, except that 1.15 M LiPF$_6$ and an additive including 1, 2, 3, and 5 wt % of vinylene carbonate based on the to weight of electrolyte were respectively added to a mixed solvent of ethylene carbonate (EC)/ethyl methyl carbonate (EMC)/dimethyl carbonate (DMC)/fluorobenzene (FB) in a volume ratio of 30/50/10/10 to prepare compositions to form electrolytes.

Comparative Example 12

A lithium secondary battery cell was prepared in the same manner as in Examples 10 to 13, except that 1.15 M LiPF$_6$ and an additive including 2 wt % of vinylene carbonate based on the total weight of electrolyte were added to a mixed solvent of ethylene carbonate (EC)/ethyl methyl carbonate (EMC)/fluorobenzene (FB)/propylene carbonate (PC) in a volume ratio of 30/50/10/10 to prepare a composition to form an electrolyte.

Figure 6:
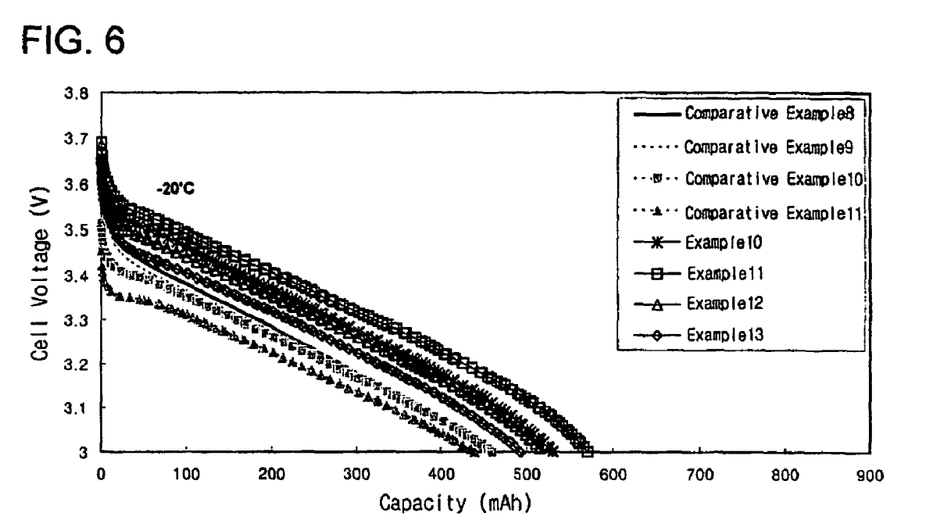
FIG. 6 is a graph illustrating the discharge characteristics at a low temperature of the battery cells according to Examples 10 to 13 of the present invention, and Comparative Examples 8 to 11.

The lithium battery cells according to Examples 10 to 13 and Comparative Examples 8 to 11 were charged at 0.5 C, to a cut-off current of 80 mA and a cut-off voltage of 4.2 V at the temperature of −20° C. under constant current and constant voltage (CC-CV), and then discharged at 0.5 C to a cut-off voltage of 3 V. The results are shown in FIG. 6. As shown in FIG. 6, the cells of Examples 10 to 13 using electrolyte including the fluoroethylene additive show better discharge characteristics at low temperature than the discharge characteristics of Comparative Examples 8 to 11 using electrolyte including vinylene carbonate.

Figure 7A:
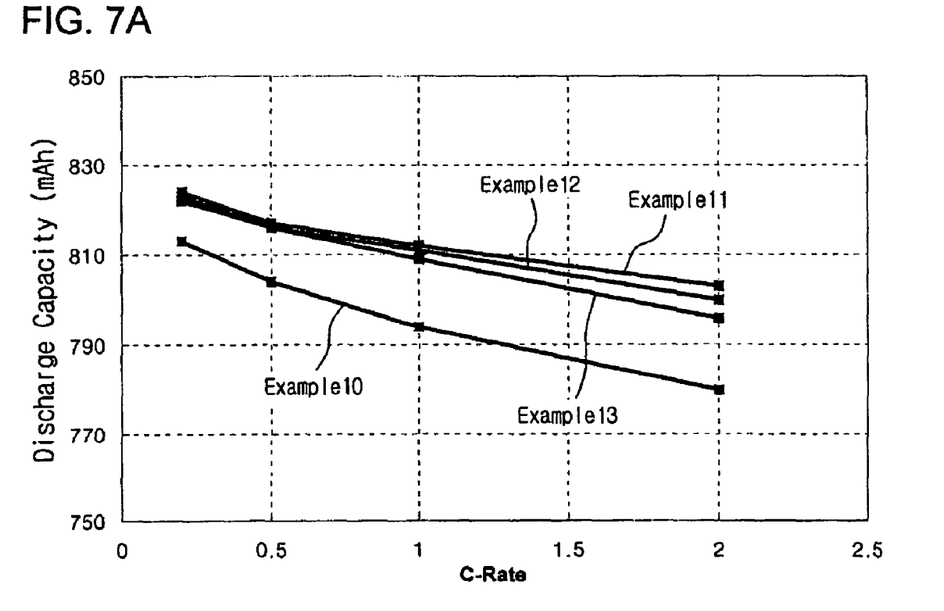
FIGS. 7A and 7B are graphs illustrating the capacity at various C-rates of the battery cells according to Examples 10 to 13 of the present invention, and Comparative Examples 8 to 11, respectively.
Figure 7B:
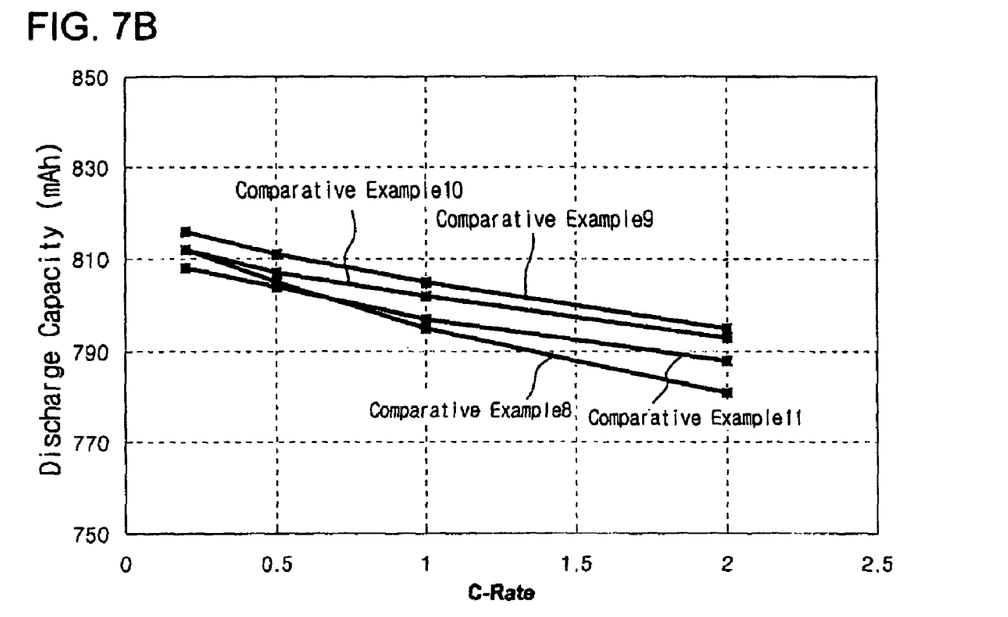

With respect to the lithium battery cells according to Examples 10 to 13 and Comparative Examples 8 to 11, discharge characteristics according to C-rate were measured. The cells according to Examples 10 to 13 and Comparative Examples 8 to 11 were charged at 0.5 C, to a cut-off current of 80 mA and a cut-off voltage of 4.2 V under constant current and constant voltage (CC-CV), and then discharged at various C-rates of 0.2 C, 0.5 C, 1 C, and 2 C to a cut-off voltage of 3 V. The results of Examples and Comparative Examples are shown in FIGS. 7A and 7B respectively. As shown in FIGS. 7A and 7B, the cells of Examples 10 to 13 using electrolyte including the fluoroethylene additive show better discharge characteristics according to C-rates than the discharge characteristics of Comparative Examples 8 to 11 using electrolyte including vinylene carbonate.

Figure 8:
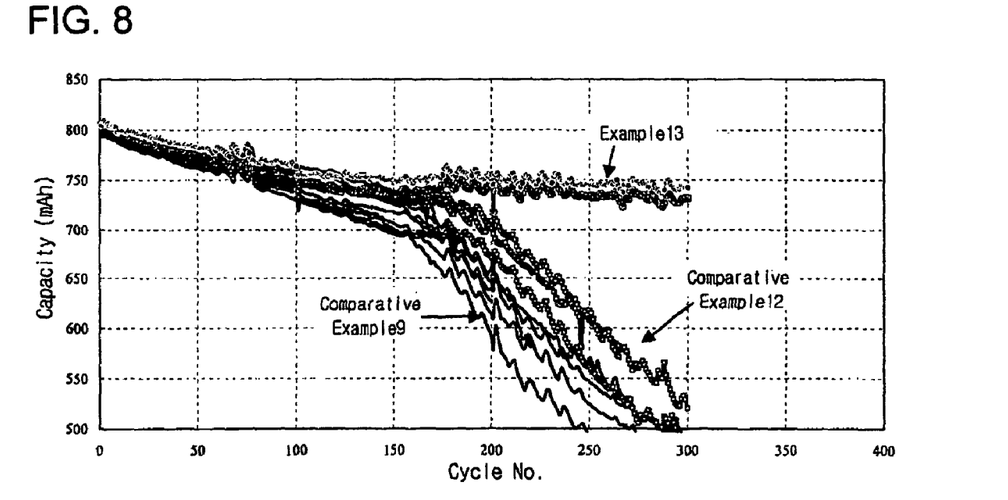
FIG. 8 is a graph illustrating cycle life characteristics of the battery cells according to Example 13 of the present invention, and Comparative Examples 9 and 12.

The cells according to Example 13 and Comparative Examples 9 and 12 were charged at 1 C, to a cut-off current of 80 mA and a cut-off voltage of 4.2 V under constant current and constant voltage (CC-CV), and then discharged at 1 C to a cut-off voltage of 3 V. The charge-discharge was repeated to evaluate cycle life characteristics. The results are shown in FIG. 8. As illustrated in FIG. 8, cycle lives of Comparative Examples 9 and 12 including the vinylene carbonate additive decreased significantly at about the 170$^{th}$ cycle, but that of Example 13 was maintained excellently at 300$^{th}$ cycle.

The cells of Examples 1 to 3 were disintegrated after charge-discharge to obtain negative material which was dried to obtain a powder. Using the powder sample and a copper target, XRD analysis was performed at a scan rate of 0.02°/second. Resolution of the detector was 0.037 degree, and CuKa was used for X-ray radiation. As a result of XRD analysis, peaks of graphite were present at 20 to 25 degrees.

The cell of Example 1 was disintegrated after charge-discharge to obtain electrolyte. Using the electrolyte, gas chromatography-mass analysis (GC-MS) was performed under the condition of temperature increments of 15° C./minute at 40° C. As a result, a peak corresponding to fluoroethylene carbonate additive was represented at 14 minutes.

The additive compounds of the present invention are decomposed at initial charging earlier than a carbonate-based solvent, and inhibit decomposition of the carbonate-based solvent. The lithium secondary battery including the electrolyte reduces gas generation and internal pressure inside the battery from decomposition of the carbonate-based solvent, and shows improved discharge characteristics and low temperature characteristics.

While the present invention has been described in detail with reference to the preferred embodiments, those skilled in the art will appreciate that various modifications and substitutions may be made thereto without departing from the spirit and scope of the present invention as set forth in the appended claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte of a lithium secondary battery comprising:
    lithium salts;
    a first organic solvent; and
    a carbonate-based additive compound having substituents selected from the group consisting of a halogen, a cyano (CN), and a nitro ($NO_2$),
    wherein the carbonate-based additive compound is added in an amount of 0.01 to 10 wt %.

2. The electrolyte of a lithium secondary battery according to claim 1, wherein the carbonate-based additive compound is a cyclic carbonate.

3. The electrolyte of a lithium secondary battery according to claim 1, wherein the carbonate-based additive compound is a carbonate represented by formula (1):

(1)

wherein X is selected from the group consisting of a halogen, a cyano (CN), and a nitro ($NO_2$).

4. The electrolyte of a lithium secondary battery according to claim 1, wherein the carbonate-based additive compound is fluoroethylene carbonate.

5. The electrolyte of a lithium secondary battery according to claim 1, wherein the carbonate-based additive compound is added in an amount of 0.01 to 5 wt % based on the total amount of the electrolyte.

6. The electrolyte of a lithium secondary battery according to claim 1, wherein the lithium salts are at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbf_6$, $LiAlO_4$, $LiAlCl_4$, $LiN(C_xF_{2x+1}SO_2)(C_yF_{2y+1}SO_2)$ (where x and y are natural numbers), LiCl, and LiI.

7. The electrolyte of a lithium secondary battery according to claim 6, wherein the lithium salts are used in a concentration ranging from 0.6 to 2.0 M.

8. The electrolyte of a lithium secondary battery according to claim 1, wherein the first organic solvent has a boiling point of 100° C.

9. The electrolyte of a lithium secondary battery according to claim 8, wherein the first organic solvent has a boiling point of 150° C.

10. The electrolyte of a lithium secondary battery according to claim 9, wherein the first organic solvent has a boiling point of 200° C.

11. The electrolyte of a lithium secondary battery according to claim 1, wherein the first organic solvent is selected from the group consisting of γ-butyrolactone, ethylene carbonate, dipropyl carbonate, acid anhydride, N-methyl pyrrolidone, N-methylacetamide, N-methyl formamice, acetonitrile, dimethyl formamide, sulforane, dimethyl sulfoxide, dimethyl sulfite, and a mixture thereof.

12. The electrolyte of a lithium secondary battery according to claim 1, wherein the electrolyte further comprises a second organic solvent.

13. The electrolyte of a lithium secondary battery according to claim 12, wherein the second organic solvent is selected from the group consisting of dimethyl carbonate (DMC), diethyl carbonate (DEC), methylpropyl carbonate (MPC), ethylpropyl carbonate (EPC), methylethyl carbonate (MEC), propylene carbonate (PC), butylene carbonate (BC), and a mixture thereof.

14. The electrolyte of a lithium secondary battery according to claim 1, wherein the electrolyte further comprises an aromatic hydrocarbon organic solvent of formula (2):

(2)

wherein R is a halogen or a $C_1$ to $C_{10}$ alkyl, and n is an integer of 0 to 6.

15. The electrolyte of a lithium secondary battery according to claim 14, wherein the aromatic hydrocarbon organic solvent is selected from the group consisting of benzene, fluorobenzene, toluene, fluorotoluene, trifluorotoluene, xylene, and a mixture thereof.

16. The electrolyte of a lithium secondary battery according to claim 1, wherein the electrolyte further comprises an organic sulfone-based compound of formula (3):

wherein $R_1$ and $R_2$ are independently selected from the group consisting of a primary, secondary or tertiary alkyl group, an alkenyl group, an aryl group, and a cycloalkyl group, or $R_1$ and $R_2$ are bound together to form a cyclic ring.

17. The electrolyte of a lithium secondary battery according to claim 16, wherein $R_1$ and $R_2$ are independently selected from the group consisting of a $C_1$ to $C_4$ alkyl, a $C_2$ to $C_4$ alkenyl, a $C_6$ to $C_{14}$ aryl, and a $C_3$ to $C_6$ cycloalkyl.

18. The electrolyte of a lithium secondary battery according to claim 16, wherein $R_1$ and $R_2$ are independently a halogen-substituted alkyl group, an alkenyl group, an aryl group, or a cycloalkyl group.

19. The electrolyte of a lithium secondary battery according to claim 16, wherein the sulfone-based compound is selected from the group consisting of vinyl sulfone, methyl sulfone, methylvinyl sulfone, ethylvinyl sulfone, phenyl sulfone, phenylvinyl sulfone, chlorophenylvinyl sulfone, fluorophenylvinyl sulfone, benzyl sulfone, tetramethylene sulfone, butadiene sulfone, and a mixture thereof.

20. The electrolyte of a lithium secondary battery according to claim 16, wherein the sulfone-based compound is added in an amount of 0.01 to 10 wt % based on the total amount of the electrolyte.

21. The electrolyte of a lithium secondary battery according to claim 20, wherein the sulfone-based compound is added in an amount of 0.01 to 6 wt % based on the total amount of the electrolyte.

22. The electrolyte of a lithium secondary battery according to claim 1, wherein the electrolyte further comprises a compound of formula (4):

wherein $R_4$ is a $C_1$ to $C_{10}$ alkyl, a $C_1$ to $C_{10}$ alkoxy, or a $C_6$ to $C_{10}$ aryl, X is a halogen, and m and n are integers ranging from 1 to 5, where m+n is less than or equal to 6.

23. The electrolyte of a lithium battery according to claim 22, wherein the compound of formula (4) is a compound selected from the group consisting of 3-fluoroanisole, 3-chloroanisole, 3-bromoanisole, 4-fluoroanisole, 4-chloroanisole, 4-bromoanisole, 2,4-difluoroanisole, 3,5-difluoroanisole, 3-chloro-5-fluoroanisole, and a mixture thereof.

24. The electrolyte of a lithium secondary battery according to claim 22, wherein the compound of formula (4) is added in an amount of 0.01 to 10 wt % based on the total amount of the electrolyte.

25. The electrolyte of a lithium secondary battery according to claim 24, wherein the compound of formula (4) is added in an amount of 0.01 to 6 wt % based on the total amount of the electrolyte.

26. The electrolyte of a lithium secondary battery according to claim 1, wherein the electrolyte further comprises a swelling-inhibiting additive.

27. The electrolyte of a lithium secondary battery according to claim 26, wherein the swelling-inhibiting additive is selected from the group consisting of propane sultone, bisphenol, dimethylfuran, 1,3-propandiol cyclic sulfate, N-acetylcaprolactam, and a mixture thereof.

28. An electrolyte of a lithium secondary battery comprising lithium salts; an organic solvent with a high boiling point; a carbonate-based additive compound having substituents selected from the group consisting of a halogen, a cyano (CN), and a nitro (NO$_2$), and an organic sulfone-based compound of formula (3):

wherein $R_1$ and $R_2$ are independently selected from the group consisting of a primary, secondary, or tertiary alkyl group, an alkenyl group, an aryl group, and a cycloalkyl group, or $R_1$ and $R_2$ are bound together to form a cyclic ring, wherein the carbonate-based additive compound is added in an amount of 0.01 to 10 wt %.

29. The electrolyte of a lithium secondary battery according to claim 28, wherein $R_1$ and $R_2$ are independently selected from the group consisting of a $C_1$ to $C_4$ alkyl, a $C_2$ to $C_4$ alkenyl, a $C_6$ to $C_{14}$ aryl, and a $C_3$ to $C_6$ cycloalkyl.

30. The electrolyte of a lithium secondary battery according to claim 28, wherein either one of $R_1$ and $R_2$ is a vinyl.

31. The electrolyte of a lithium secondary battery according to claim 28, wherein the sulfone-based compound is selected from the group consisting of vinyl sulfone, methyl sulfone, methylvinyl sulfone, ethylvinyl sulfone, phenyl sulfone, phenylvinyl sulfone, chlorophenylvinyl sulfone, fluorophenylvinyl sulfone, benzyl sulfone, tetramethylene sulfone, butadiene sulfone, and a mixture thereof.

32. The electrolyte of a lithium secondary battery according to claim 28, wherein the carbonate-based additive compound is a cyclic carbonate.

33. The electrolyte of a lithium secondary battery according to claim 28 wherein the carbonate-based additive compound is a carbonate represented by formula (1):

wherein X is selected from the group consisting of a halogen, a cyano (CN), and a nitro (NO$_2$).

34. The electrolyte of a lithium secondary battery according to claim 28 wherein the carbonate-based additive compound is fluoroethylene carbonate.

35. The electrolyte of a lithium secondary battery according to claim 28, wherein the carbonate-based additive compound is added in an amount of 0.01 to 5 wt % based on the total amount of the electrolyte.

36. A lithium secondary battery comprising:
a positive electrode including a material that reversibly intercalates/deintercalates lithium ions, or a material that reversibly forms a lithium-containing compound as a positive active material;
a negative electrode including a lithium metal, a lithium-containing alloy, or a material that reversibly intercalates/deintercalates lithium ions; and
an electrolyte comprising:
lithium salts;
an organic solvent with a high boiling point; and
a carbonate-based additive compound having substituents selected from the group consisting of a halogen, a cyano (CN), and a nitro (NO$_2$), wherein the carbonate-based additive compound is added in an amount of 0.01 to 10 wt % based on a total amount of the electrolyte.

37. The lithium secondary battery according to claim 36, wherein the positive electrode includes a lithium-nickel-based or a lithium-nickel-manganese-based oxide.

38. The lithium secondary battery according to claim 36, wherein the negative electrode includes graphite.

39. The lithium secondary battery according to claim 38, wherein the graphite comprises ito 100 wt % of natural graphite.

40. The lithium secondary battery according to claim 36, wherein the lithium secondary battery includes a lithium ion battery or a lithium polymer battery.

41. An electrolyte of a lithium secondary battery comprising:
a mixed solvent formed by mixing γ-butyrolactone (GBL)/ethylene carbonate (EC)/ethyl methyl carbonate (EMC)/dimethyl carbonate (DMC)/fluorobenzene (FB), LiPF$_6$ to a concentration of 0.6 to 2.0 M, and an ethylene carbonate derivative added in an amount to obtain 0.01 to 10 wt %, based on a total amount of the electrolyte,
wherein the ethylene carbonate derivative includes electron-withdrawing groups with high electronegativity selected from the group consisting of a halogen, a cyano (CN), and a nitro (NO$_2$), the ethylene carbonate derivative being represented by formula (1):

(1)

wherein X is selected from the group consisting of a halogen, a cyano (CN), and a nitro (NO$_2$).

42. The electrolyte of claim 41, wherein the electrolyte is included in a lithium secondary battery, the lithium battery comprising:
a positive electrode prepared by:
mixing in N-methyl-2-pyrrolidone (NMP) to prepare a positive material slurry:
a positive active material comprising LiCoO$_2$;
a conductive agent; and
a binder comprising polyvinylidenefluoride (PVdF);
coating, on an aluminum foil;
drying;
compressing; and
a negative electrode formed by:
mixing to prepare a negative material slurry:
a negative active material comprising artificial graphite;
oxalic acid; and
a binder comprising PVdF;
coating on a copper foil;
drying; and
compressing;
a separator comprising a polyethylene porous film separator interposed between the positive electrode and the negative electrode,
wherein the combination of the positive electrode, separator and the negative electrode are wound together and placed in a prismatic can to form the battery.

43. An electrolyte of a lithium secondary battery comprising:
a mixture comprising:
γ-butyrolactone (GBL);
lithium salts;
a carbonate-based additive compound represented by formula (1) wherein X is selected from the group consisting of a halogen, a cyano (CN), and a nitro (NO$_2$):
wherein the carbonate-based additive compound is added in an amount of 0.01 to 10 wt % based on a total weight of the electrolyte (1)

an organic sulfone-based compound of formula (3):

(3)

wherein R$_1$ and R$_2$ are independently selected from the group consisting of a primary, secondary or tertiary alkyl group, an alkenyl group, an aryl group, and a cycloalkyl group, or R$_1$ and R$_2$ are bound together to form a cyclic ring.

44. The electrolyte according to claim 43, wherein the carbonate-based additive compound is fluoroethylene carbonate.

45. The electrolyte according to claim 43, wherein the carbonate-based additive compound is added in substantially an amount of 0.01 to 5 wt % based on the total weight of the electrolyte.

46. The electrolyte according to claim 43, wherein the lithium salts are at least one selected from the group consisting of LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiSbF$_6$, LiAlO$_4$, LiAlCl$_4$, LiN(C$_x$F$_{2x+1}$SO$_2$)(C$_y$F$_{2y+1}$SO$_2$) (where x and y are natural numbers), LiCl, and LiI.

47. The electrolyte according to claim 43, wherein $R_1$ and $R_2$ are independently selected from the group consisting of a $C_1$ to $C_4$ alkyl, a $C_2$ to $C_4$ alkenyl, a $C_6$ to $C_{14}$ aryl, and a $C_3$ to $C_6$ cycloalkyl.

48. The electrolyte according to claim 43, wherein $R_1$ and $R_2$ are independently a halogen-substituted alkyl group, an alkenyl group, an aryl group, or a cycloalkyl group.

49. The electrolyte according to claim 43, wherein the sulfone-based compound is selected from the group consisting of vinyl sulfone, methyl sulfone, methylvinyl sulfone, ethylvinyl sulfone, phenyl sulfone, phenylvinyl sulfone, chlorophenylvinyl sulfone, fluorophenylvinyl sulfone, benzyl sulfone, tetramethylene sulfone, butadiene sulfone, and a mixture thereof.

50. The electrolyte according to claim 43, wherein the sulfone-based compound is added in substantially an amount of 0.01 to 10 wt % based on the total weight of the electrolyte.

51. The electrolyte according to claim 50, wherein the sulfone-based compound is added in substantially an amount of 0.01 to 6 wt % based on the total amount of the electrolyte.

52. The electrolyte according to claim 46, wherein the lithium salts are used in a concentration ranging from 0.6 to 2.0 M.

53. The electrolyte according to claim 43, wherein the electrolyte further comprises an aromatic hydrocarbon organic solvent of formula (2):

(2)

wherein R is a halogen or a $C_1$ to $C_{10}$ alkyl, and n is an integer of 0 to 6.

54. The electrolyte according to claim 53, wherein the aromatic hydrocarbon organic solvent is selected from the group consisting of benzene, fluorobenzene, toluene, fluorotoluene, trifluorotoluene, xylene, and a mixture thereof.

55. The electrolyte according to claim 43, wherein the electrolyte further comprises a compound of formula (4):

(4)

wherein $R_4$ is a $C_1$ to $C_{10}$ alkyl, a $C_1$ to $C_{10}$ alkoxy, or a $C_6$ to $C_{10}$ aryl, X is a halogen, and m and n are integers ranging from 1 to 5, where m+n is less than or equal to 6.

56. The electrolyte according to claim 55, wherein the compound of formula (4) is a compound selected from the group consisting of 3-fluoroanisole, 3-chloroanisole, 3-bromoanisole, 4-fluoroanisole, 4-chloroanisole, 4-bromoanisole, 2,4-difluoroanisole, 3,5-difluoroanisole, 3-chloro-5-fluoroanisole, and a mixture thereof.

57. The electrolyte according to claim 55, wherein the compound of formula (4) is added in substantially an amount of 0.01 to 10 wt % based on the total amount of the electrolyte.

58. The electrolyte according to claim 57, wherein the compound of formula (4) is added in substantially an amount of 0.01 to 6 wt % based on the total amount of the electrolyte.

* * * * *

UNITED STATES PATENT AND TRADEMARK OFFICE
CERTIFICATE OF CORRECTION

PATENT NO. : 7,223,500 B2  Page 1 of 1
APPLICATION NO. : 10/653192
DATED : May 29, 2007
INVENTOR(S) : Hyeong-Gon Noh et al.

It is certified that error appears in the above-identified patent and that said Letters Patent is hereby corrected as shown below:

Column 16, line 9
change "$LiSbf_6$" to --$LiSbF_6$--

Column 19, line 26
change "ito" to --1 to--

Signed and Sealed this

Fourteenth Day of August, 2007

JON W. DUDAS
*Director of the United States Patent and Trademark Office*